(12) United States Patent
van Haag

(10) Patent No.: US 7,169,101 B2
(45) Date of Patent: Jan. 30, 2007

(54) DEFLECTION COMPENSATION ROLL

(75) Inventor: Rolf van Haag, Kerken (DE)

(73) Assignee: Voith Paper Patent GmbH, Heidenheim (DE)

( * ) Notice: Subject to any disclaimer, the term of this patent is extended or adjusted under 35 U.S.C. 154(b) by 430 days.

(21) Appl. No.: 10/132,294

(22) Filed: Apr. 26, 2002

(65) Prior Publication Data

US 2003/0017926 A1      Jan. 23, 2003

(30) Foreign Application Priority Data

May 10, 2001   (DE)   ................. 101 22 648

(51) Int. Cl.
  *B29C 43/46*        (2006.01)
(52) U.S. Cl. .................. 492/7; 29/895; 101/275
(58) Field of Classification Search ............ 101/275, 101/216
  See application file for complete search history.

(56) References Cited

U.S. PATENT DOCUMENTS

| | | | |
|---|---|---|---|
| 4,249,290 A | | 2/1981 | Lehmann |
| 4,319,522 A | * | 3/1982 | Marchioro et al. ...... 100/162 B |
| 4,563,245 A | * | 1/1986 | Wanke et al. ............ 162/358.3 |
| 4,848,119 A | * | 7/1989 | Pav et al. .................... 72/13.3 |
| 4,984,343 A | * | 1/1991 | Schrörs ......................... 492/7 |
| 5,033,317 A | | 7/1991 | Van Haag |
| 5,060,357 A | * | 10/1991 | Roerig et al. ................... 492/7 |
| 5,063,649 A | * | 11/1991 | Wenzel et al. ................ 492/15 |
| 5,372,068 A | | 12/1994 | Lehmann et al. |
| 5,487,715 A | * | 1/1996 | Schiel ......................... 492/16 |
| 5,800,324 A | * | 9/1998 | Schiel ............................ 492/7 |
| 5,928,121 A | * | 7/1999 | Stotz et al. ..................... 492/7 |
| 6,228,009 B1 | * | 5/2001 | Van Haag ...................... 492/7 |
| 6,361,483 B1 | * | 3/2002 | Kirchner ...................... 492/16 |
| 6,500,304 B1 | | 12/2002 | Holopainen et al. |
| 6,524,228 B1 | | 2/2003 | Schrörs |

FOREIGN PATENT DOCUMENTS

| | | |
|---|---|---|
| CH | 614502 | 11/1979 |
| CH | 673415 | 3/1990 |
| CH | 684526 | 10/1994 |
| DE | 3710724 | 5/1988 |
| DE | 3802234 | 9/1988 |
| DE | 3909911 | 6/1990 |
| DE | 29509545 | 9/1995 |
| DE | 29509545 | 11/1995 |
| DE | 19833308 | 2/2000 |
| DE | 19854339 | 6/2000 |
| EP | 0256465 | 2/1988 |
| EP | 0764790 * | 6/1996 |
| EP | 0772715 | 9/1998 |
| EP | 0764790 | 5/2000 |
| WO | 00/09805 | 2/2000 |

* cited by examiner

*Primary Examiner*—Marc Jimenez
(74) *Attorney, Agent, or Firm*—Greenblum & Bernstein, P.L.C.

(57) ABSTRACT

Deflection compensation roll and process for reducing vibrations in deflection roll. The roll includes antifriction bearings, a roll jacket supported in an area of its axial ends on the antifriction bearings, and hydraulic supports arranged to hydraulically support the roll jacket parallel to a working plane. A damping device, positioned next to each antifriction bearing, is structured and arranged to act essentially perpendicular to the working plane.

18 Claims, 1 Drawing Sheet

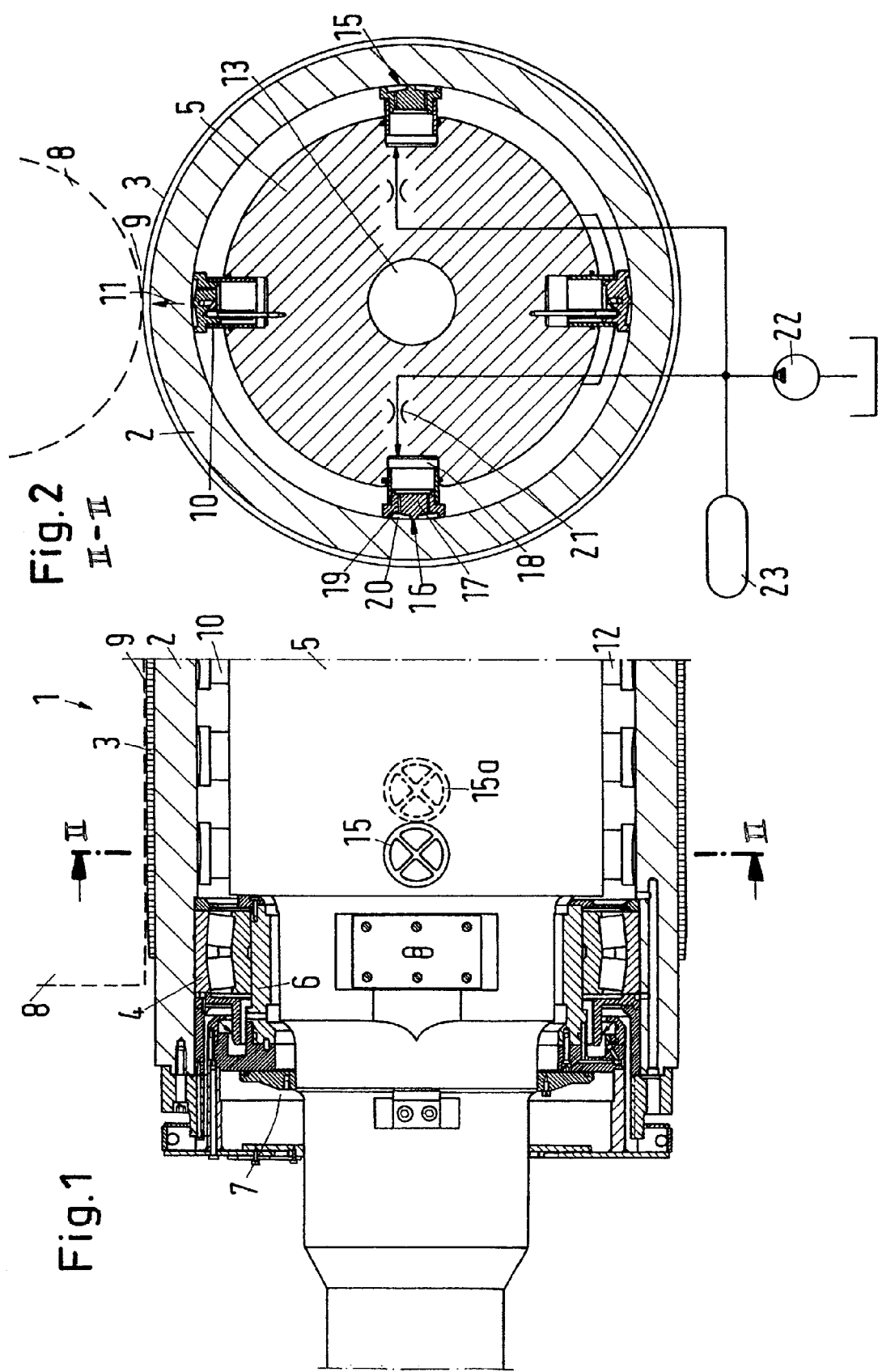

DEFLECTION COMPENSATION ROLL

CROSS-REFERENCE TO RELATED APPLICATIONS

The present application claims priority under 35 U.S.C. §119 of German Patent Application No. 101 22 648.9, filed on May 10, 2001, the disclosure of which is expressly incorporated by reference herein in its entirety.

BACKGROUND OF THE INVENTION

1. Field of the Invention

The present invention relates to a deflection compensation roll with a roll jacket which is arranged on antifriction bearings in the area of its axial ends and is hydraulically supported parallel to a working plane.

2. Discussion of Background Information

Such a deflection compensation roll is known from DE 198 54 339 A1. Rolls of this kind are preferred for use as end rolls in a calender for glazing a paper web or another material web, i.e., to impinge in the nips of the calender with increased pressure, if necessary also at increased temperature. In addition to the antifriction bearings, the known roll features a hydrostatic support element that is designed to guarantee a minimum load on the antifriction bearings. This is intended to make it possible for an additional force to be exerted that is sufficient for an orderly rolling entrainment of the roll bodies of the antifriction bearing.

DE 198 33 308 A1 shows another deflection compensation roll with hydrostatic support elements that work offset by 90° to the working plane. These support elements are used to position the jacket. They are supported on a carrier that follows a movement of the support elements in the working plane. There is a mechanical connection for this between the carrier of the transverse support elements and the support elements in the active direction.

A further deflection compensation roll is known from EP 0 764 790 B1. In this case the forces necessary for the support are applied by using two rows of opposing support rolls, between which the angle is smaller than 180°.

EP 0 772 715 B1 describes the use of a roll with "spreading elements" at the roll end, i.e., hydraulic support elements which exert forces acting on the inner circumference of the end of the hollow cylinder crosswise to the working plane and pull the end of the hollow cylinder apart, so to speak, relative to the working plane, causing the hollow cylinder to be pulled away in the nip at the end of the nip.

As mentioned at the outset, such deflection compensation rolls are preferred for use in calenders for treating paper webs. The operating speed of such calenders has been consistently increased over recent years. However, the increase in the operating speed also entails an increase in the rotational speed of the roll jacket. This leads to the roll jacket reaching critical speed ranges where there is a danger of a resonance phenomenon. Since such resonances can be calculated beforehand, in most cases it is possible to take remedial action.

It has now been shown with some rolls that undesirable vibrations occur at rotational speeds at which they would not normally have been expected. In particular, an inherent frequency of the roll jacket has been observed far below its first inherent deflection frequency. Such a resonance vibration is possibly also one of the causes of the formation of so-called barring, in which transverse stripes occur on the paper web during glazing which, when they become visible, lead to the paper web being discarded.

SUMMARY OF THE INVENTION

The present invention improves the operational behavior of the roll.

According to the invention, a deflection compensation roll of the type mentioned at the outset includes a damping device arranged next to each antifriction bearing to act essentially perpendicular to the working plane.

This is based on the following considerations: it is supposed that the above-mentioned low-frequency vibration is a rigid-body vibration of the roll jacket on the spring system of the antifriction bearings. The antifriction bearings have a relatively high rigidity in the active direction, i.e., in the loading direction. At right angles to the loading direction, i.e., horizontally in the case of a vertically standing roll stack, the bearing rigidity is noticeably lower due to the bearing play normally found in antifriction bearings. If a damping device acting perpendicular to the working plane is arranged directly adjacent to each antifriction bearing, the vibrational speed of the roll jacket is lowered. As a result, the vibrational amplitude can also be drastically reduced. Such a damping device therefore leads to a considerable improvement in operational behavior, particularly at frequencies below the inherent deflection frequency of the roll jacket.

The damping device is preferably arranged on the axially inner side of the antifriction bearing. As a rule, there is more construction space on the axially inner side of the antifriction bearing, so that the installation of the damping device does not entail any major constructional complications. However, above all the damping device acts on an area of the antifriction bearing which features a larger axial length than the area axially outside the antifriction bearing. The damping properties are thus improved.

The damping device preferably exerts a basic force on the roll jacket. The damping device is therefore used not only to damp a movement of the roll jacket perpendicular to the working plane, but also to prestress the roll jacket, as it were. It is thus possible to apply a base load to the antifriction bearing which otherwise rotates freely on the bush, which base load substantially improves the bearing cage control.

It is particularly preferred here for the base load to be embodied asymmetrically relative to the working plane. The asymmetrical embodiment of the base load also leads to a correspondingly one-sided load of the antifriction bearings. Problems with rotating bearing outer rings, lubricatings and divergent cage frequencies are effectively reduced by the one-sided or asymmetrical effect of the damping device.

The damping device is preferably embodied as a hydraulic support source device. This embodiment has several advantages. For one thing, it is possible to have the damping device act on the roll jacket virtually without friction. A liquid film can form between a support source and the roll jacket, as is known from hydrostatic and hydrodynamic support sources which act in the active direction of the roll. Moreover, hydrostatic support sources in particular already have a certain inner damping by a throttle through which the bearing pockets are supplied with oil.

It is particularly preferred here for a throttle arrangement to be arranged upstream of the hydraulic support source arrangement. The throttle arrangement is thus located in the supply path of the support sources. By means of this advance throttling, a relatively small oil volume is inserted between the support source and the yoke in which the support source is arranged. During a pressure pulsation the oil volume expelled by the support source movement has to flow in and out through the throttle positions. Vibration energy is dissipated by the frictional losses at the throttle. In this way a high damping and an increase in the bearing rigidity can be achieved.

The support source arrangement preferably features a supply device with a pressure accumulator. The pressure accumulator has the advantage that the pressure during the vibration movement of the roll jacket upstream of the throttle arrangement can be maintained at a constant level.

The support source arrangement preferably produces two force components acting in opposite directions. This has the advantage that vibration movements of the roll jacket are reliably damped in several directions. The roll jacket is thus also kept in a closer placement to the support elements.

The support source arrangement preferably features support sources, the static gap height of which is more than 25 µm. This gap height can be adjusted by the choice of the individual throttle positions in the supply of the support source or in the supply of the bearing pockets on the support source. At 25 µm there is a sufficient reserve to prevent the roll jacket striking the bearing surface of the support position during a vibration movement of the roll jacket.

The support source arrangement preferably features more than two support sources per bearing. Two support sources can be arranged, e.g., on each bearing side next to each other axially or in the rotational direction of the roll jacket. With several support sources the same damping capacity is achieved with higher security against an undesirable impact of the jacket on the bearing surface of the support source.

The present invention is directed to a deflection compensation roll that includes antifriction bearings, a roll jacket supported in an area of its axial ends on the antifriction bearings, and hydraulic supports arranged to hydraulically support the roll jacket parallel to a working plane. A damping device, positioned next to each antifriction bearing, is structured and arranged to act essentially perpendicular to the working plane.

According to a feature of the instant invention, the damping device may be located on an axially inner side of the antifriction bearing.

In accordance with another feature of the invention, the damping device can be arranged to exert a base force on the roll jacket. The base force can be developed asymmetrically relative to the working plane.

Moreover, the damping device can include a hydraulic support source arrangement. The deflection compensation roll may also include a throttle arrangement arranged upstream of the hydraulic support source arrangement. The hydraulic support source arrangement can include a supply device with a pressure accumulator. Further, the hydraulic support source arrangement may be arranged to produce two force components acting in opposite directions. Still further, the hydraulic support source arrangement can include support sources, the static gap height of which is more than about 25 µm. The hydraulic support source arrangement can include more than two support sources per bearing, and may include four support sources per bearing.

According to still another feature of the invention, an operating speed of the roll may be higher than 0.9 nk, in which $$nk = 1/(2\pi) \cdot \sqrt{C_{total}/m}$$

and $C_{total}$ represents total rigidity and m represents the mass of the roll jacket.

The present invention is directed to a process for reducing vibrations in a deflection compensation roll having antifriction bearings, a roll jacket, hydraulic supports and damping device positioned next of each antifriction bearing. The process includes supporting the roll jacket, in an area of its axial ends, on the antifriction bearings, hydraulically supporting the rolljacket parallel to a working plane via the hydraulic supports, and actuating the damping devices to act essentially perpendicular to the working plane.

In accordance with a feature of the invention, the damping device can be located on an axially inner side of the antifriction bearing.

According to another feature of the instant invention, the process can further include exerting a base force on the roll jacket via the damping device. The base force can be developed asymmetrically relative to the working plane.

In accordance with a yet another feature of the present invention, the process can include producing two force components acting in opposite directions via the damping device.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 illustrates a diagrammatic longitudinal section through one end of a roll; and FIG. 2 illustrates a section II—II depicted in FIG. 1.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

A roll 1, which is embodied as a through deflection compensation roll, features a roll jacket 2 which can be provided with an elastic coating 3 if roll 1 is to be installed in a calender as a "soft" roll. However, coating 3 can be omitted, particularly if roll 1 is to be used in a calender stack or as a "hard" roll in a calender.

Roll jacket 2 is rotatably supported by antifriction bearings 4 on a yoke 5. If necessary, antifriction bearings 4 can be arranged on a bearing carrier 6 which can be displaced relative to yoke 5. In this case it is a roll with jacket lift. A sealing arrangement 7 is provided on an axial outer side of antifriction bearings 4.

In operation, roll 1 acts together with a diagrammatically represented mating roll 8 to form a nip 9, through which a material web, e.g., a paper web, can be guided in order to be impacted with increased pressure there.

A number of hydraulic support elements 10 are arranged between yoke 5 and roll jacket 2, which operate according to the hydrostatic principle. Support elements 10 act in the direction of mating roll 8. This direction is hereinafter referred to as the "active direction" (working plane). It is represented in FIG. 2 by an arrow 11.

Further support elements 12 are arranged on the opposite side between yoke 5 and roll jacket 2, which against active direction 11, i.e., in order to achieve a targeted pressure relief in certain areas. As such a roll construction is generally known, the instant application will dispense with a more detailed representation of the supply of support elements 10 and 12. This supply is ensured diagrammatically by a supply channel 13 that crosses yoke 5 in the axial direction. If necessary, all support elements 10 and 12 can also be controlled separately or in groups in order to produce a certain deflection profile for roll jacket 2.

In addition, damping elements 15 and 16 are arranged between roll jacket 2 and yoke 5. Damping elements 15 and 16 act perpendicular to active direction 11, and, therefore, horizontally in the case of a vertically standing roll stack. Damping elements 15 and 16 are embodied as hydrostatic support elements, i.e., they feature a back-up die 17 mounted in a cylinder bore 18 in yoke 5. The surge chamber formed in cylinder bore 18 is connected to pressure pockets 20 via throttles 19. Cylinder bore 18 is connected to a pressure source 22 via a throttle 21, which pressure source is represented here as a pump. A line branches off to a pressure accumulator 23 between pressure source 22 and throttle 21.

A corresponding arrangement is also provided for damping element 15. Damping element 15 and damping element 16 are arranged symmetrically to one another and are also supplied symmetrically to one other.

Thus, damping element 15 and damping element 16 permanently generate a base force on roll jacket 2. If this base force is developed asymmetrically to working plane 11, in accordance with an alternative embodiment, e.g., the force of damping element 15 is made larger than the force produced by damping element 16, an even more extensive improvement is achieved. Antifriction bearing 4, which previously ran without a load on bush 6, is provided with a base load that substantially improves the bearing cage control. As a result, the issue of rotating bearing outer rings, lubrications and divergent cage frequencies is substantially mitigated.

As can be seen from FIG. 1, a further damping element 15a can be arranged in the axial direction next to damping element 15 (the same applies to damping element 16). The two damping elements 15 and 15a can also be arranged next to each other in the rotational direction of the roll jacket (not shown in detail).

The damping elements have a diameter, e.g., of about 100 mm (diameter of cylinder bore 18). If one assumes that a corresponding damping arrangement is provided at the other end, there are a total of four support sources available for horizontal damping. Throttle 21 is embodied in an exemplary embodiment as a capillary tube with a diameter of about 2 mm and a length of about 25 mm.

The vibration of the rolljacket is determined by the following differential equation:

$$m \cdot \ddot{X} + b \cdot \dot{X} + C_{total} \cdot X = U \cdot r \cdot \omega^2 \cdot \sin(\omega t) \quad (1)$$

A damping factor of b=209,260 Ns/m is found at 40° C. for a support source for an oil of the class ISO VG 68. The jacket mass m is assumed to be 15,000 kg in the following case.

Applying the following generally applicable correlations relative to vibration results in a damping factor (damping coefficient) of $\delta$ $$\delta = b/(2m) = \frac{4 \cdot 209{,}260 \text{ Ns/m}}{2 \cdot 15{,}000 \text{ kg}} = 27.9/s \quad (2)$$

Thus, this results in a damping factor D such that $$D = \delta/\omega o = 27.9/62.015 = 0.45 \quad (3)$$

With this relatively high damping factor, applying equation 1 (where U=4.9 kg and r=0.4 m) produces a vibration amplitude of 0.1 mm and thus an effective vibration speed of the roll jacket of 4.27 mm/s.

When operating in the resonance position, the vibration speed can thus be reduced by four damping support sources from 25 mm/s to 4.27 mm/s. The pressure amplitude under the support sources of damping elements 15 and 16 is thereby approximately 1.63 bar. The pocket pressure fluctuates with an amplitude of about 1.3 bar and the gap height fluctuates with an amplitude of about 9.5 µm. In the present case, damping elements 15 and 16 are constructed such that they feature a static gap height of about 50 µm. This vibration amplitude would probably still be permissible even with a somewhat smaller gap height.

However, the same damping can also be achieved with lower gap height amplitudes by a larger or several support sources per roll side.

If, e.g., 8 damping elements with the same diameter are used, i.e., 4 damping elements per roll end, the diameter of throttle 21 can be enlarged to about 2.4 mm with the same length. In this case, the dynamic damping factor adjusts to 103,138 Ns/m. However, in this case the pressure and oil gap changes are noticeably smaller. The piston pressure amplitude amounts to only about 0.83 bar, the pocket pressure amplitude only about 0.68 bar and the gap change amplitude only about 4.8 µm. It is clear from this that the same damping capacity can be achieved by several damping elements 15 and 16 with greater protection against an undesirable impact of the support source on the jacket.

To decide when lateral damping elements 15 and 16 should be used to damp the possible movement in the antifriction bearing play, the anticipated inherent frequency can be estimated by an empirically determined bearing rigidity. To this end, e.g., a total rigidity of $C_{total}$=60 N/µm, i.e., 60·10$^5$ N/m, can be assumed. The total rigidity is essentially caused by the transverse rigidity of antifriction bearings 4, which reduces the bearing play, i.e., $C_{total}$ is still determined without damping elements 15 and 16.

The critical rotational speed nk is thus found to be $$nk = 1/(2\pi) \cdot \sqrt{C_{total}/m}$$

where m is jacket mass. The lateral damping elements are thus to be used when the maximum operating speed is more than 0.9 nk. By adding damping elements 15 and 16 a considerable increase in the transverse rigidity can be achieved in the area of the antifriction bearings.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects.

Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A deflection compensation roll comprising:
   antifriction bearings;
   a roll jacket supported in an area of its axial ends on said antifriction bearings;
   hydraulic supports arranged to hydraulically support said roll jacket parallel to a working plane; and
   a damping device, positioned next to each antifriction bearing, structured and arranged to act essentially perpendicular to the working plane and to dampen movement due to play in the antifriction bearings.

2. The deflection compensation roll in accordance with claim 1, wherein said damping device is located on an axially inner side of said antifriction bearing.

3. The deflection compensation roll in accordance with claim 1, wherein said damping device is arranged to exert a base force on said roll jacket.

4. The deflection compensation roll in accordance with claim 3, wherein the base force is developed asymmetrically relative to the working plane.

5. The deflection compensation roll in accordance with claim 1, wherein said damping device comprises a hydraulic support source arrangement.

6. The deflection compensation roll in accordance with claim 5, further comprising a throttle arrangement arranged upstream of said hydraulic support source arrangement.

7. The deflection compensation roll in accordance with claim 5, wherein said hydraulic support source arrangement comprises a supply device with a pressure accumulator.

8. The deflection compensation roll in accordance with claim 5, wherein said hydraulic support source arrangement is arranged to produce two force components acting in opposite directions.

9. The deflection compensation roll in accordance with claim 5, wherein said hydraulic support source arrangement comprises more than two support sources per bearing.

10. The deflection compensation roll in accordance with claim 9, wherein said hydraulic support source arrangement comprises four support sources per bearing.

11. A The deflection compensation roll comprising:
    antifriction bearings;
    a roll jacket supported in an area of its axial ends on said antifriction bearings;
    hydraulic supports arranged to hydraulically support said roll jacket parallel to a working plane; and
    a damping device, positioned next to each antifriction bearing, structured and arranged to act essentially perpendicular to the working plane and to dampen movement due to play in the antifriction bearings,
    wherein said damping device comprises a hydraulic support source arrangement, and said hydraulic support source arrangement comprises support sources, the static gap height of which is more than about 25 μm.

12. A deflection compensation roll comprising:
    antifriction bearings;
    a roll jacket supported in an area of its axial ends on said antifriction bearings;
    hydraulic supports arranged to hydraulically support said roll jacket parallel to a working plane; and
    a damping device, positioned next to each antifriction bearing, structured and arranged to act essentially perpendicular to the working plane,
    wherein an operating speed of said roll is higher than 0.9 nk, in which $$nk = 1/(2\pi)\sqrt{C_{total}/m}$$

and $C_{total}$ represents total rigidity and m represents the mass of the roll jacket.

13. A process for reducing vibrations in a deflection compensation roll having antifriction bearings, a roll jacket, hydraulic supports and damping device positioned next to each antifriction bearing, said process comprising:
    supporting the roll jacket, in an area of its axial ends, on the antifriction bearings;
    hydraulically supporting said roll jacket parallel to a working plane via the hydraulic supports; and
    dampening movement due to play in the antifriction bearings by actuating the damping devices to act essentially perpendicular to the working plane.

14. The process in accordance with claim 13, wherein the damping device is located on an axially inner side of the antifriction bearing.

15. The process in accordance with claim 13, further comprising exerting a base force on the roll jacket via the damping device.

16. The process in accordance with claim 15, wherein the base force is developed asymmetrically relative to the working plane.

17. The process in accordance with claim 13, further comprising producing two force components acting in opposite directions via the damping device.

18. A deflection compensation roll comprising:
    antifriction bearings;
    a roll jacket supported in an area of its axial ends on said antifriction bearings;
    hydraulic supports arranged to hydraulically support said roll jacket parallel to a working plane;
    a damping device, positioned next to each antifriction bearing, structured and arranged to act essentially perpendicular to the working plane and to dampen movement due to play in the antifriction bearings; and
    a hydraulic support source arrangement comprising a supply device with a pressure accumulator.

* * * * *